US012651342B2

(12) United States Patent
Li et al.

(10) Patent No.: US 12,651,342 B2
(45) Date of Patent: Jun. 9, 2026

(54) SELF-SUPERVISED MICROSCOPIC IMAGE SUPER-RESOLUTION PROCESSING METHOD AND SYSTEM

(71) Applicant: INSTITUTE OF BIOPHYSICS, CHINESE ACADEMY OF SCIENCES, Beijing (CN)

(72) Inventors: Dong Li, Beijing (CN); Chang Qiao, Beijing (CN); Yunmin Zeng, Beijing (CN)

(73) Assignee: INSTITUTE OF BIOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 19/406,846

(22) Filed: Dec. 2, 2025

(65) Prior Publication Data

US 2026/0087625 A1 Mar. 26, 2026

Related U.S. Application Data

(63) Continuation of application No. PCT/CN2024/100290, filed on Jun. 20, 2024.

(30) Foreign Application Priority Data

Jun. 20, 2023 (CN) .......................... 202310735660.3

(51) Int. Cl.
*G06K 9/00* (2022.01)
*G06N 3/0464* (2023.01)
*G06T 7/00* (2017.01)

(52) U.S. Cl.
CPC ......... *G06T 7/0012* (2013.01); *G06N 3/0464* (2023.01); *G06T 2207/10056* (2013.01);
(Continued)

(58) Field of Classification Search
CPC . G06T 2207/20081; G06T 2207/10064; G06T 3/4053; G06T 5/70; G06T 5/73;
(Continued)

(56) References Cited

U.S. PATENT DOCUMENTS

| | | | |
|---|---|---|---|
| 2018/0075581 A1 | 3/2018 | Shi et al. | |
| 2021/0241428 A1 | 8/2021 | Mansour et al. | |
| 2021/0272240 A1* | 9/2021 | Litwiller | .............. A61B 6/5258 |

FOREIGN PATENT DOCUMENTS

| | | |
|---|---|---|
| CN | 108460742 A | 8/2018 |
| CN | 109636733 A | 4/2019 |

(Continued)

OTHER PUBLICATIONS

International Search Report issued on Sep. 11, 2024 for PCT application No. PCT/CN2024/100290.
(Continued)

*Primary Examiner* — Gregory A Morse
*Assistant Examiner* — Kevin M Coomber
(74) *Attorney, Agent, or Firm* — Li & Cai Intellectual Property Office

(57) ABSTRACT

A method for self-supervised microscopic image super-resolution processing, comprising: collecting original fluorescence image data of a biological sample using an optical imaging system; depending on the type of the optical imaging system performing image preprocessing on the collected original fluorescence image data using a computer, to obtain a training set, and, in the computer, training a neural network for image denoising and super-resolution processing using the training set, and using the trained neural network to process the original fluorescence image data, or using the optical imaging system to process additional fluorescence image data acquired for the same biological sample.

20 Claims, 5 Drawing Sheets

(52) U.S. Cl.
CPC ............... *G06T 2207/10064* (2013.01); *G06T 2207/20081* (2013.01); *G06T 2207/20084* (2013.01)

(58) Field of Classification Search
CPC ............. G06T 2207/20084; G06T 5/60; G06T 7/0012; G06T 2207/10056; G06T 2207/30004; G06N 3/088; G06N 3/0895; G06N 3/08; G06N 3/084; G06N 3/0464; G02B 21/16; A61B 6/5258; G06V 20/69
See application file for complete search history.

(56) References Cited

FOREIGN PATENT DOCUMENTS

| | | | |
|---|---|---|---|
| CN | 109785234 | A | 5/2019 |
| CN | 110826467 | A | 2/2020 |
| CN | 115147315 | A | 10/2022 |
| CN | 115272123 | A | 11/2022 |
| CN | 115619646 | A | 1/2023 |
| CN | 115984107 | A | 4/2023 |
| CN | 116721017 | A | 9/2023 |
| EP | 3438920 | A1 * | 2/2019 .......... G06T 3/4053 |
| WO | WO-2020139835 | A1 * | 7/2020 ......... G06V 10/7715 |

OTHER PUBLICATIONS

Office Action issued on Aug. 12, 2024 for CN application No. 202310735660.3.

Notice of Allowance issued on Oct. 17, 2024 for CN application No. 202310735660.3.

Xu Liang, "Image super resolution algorithm research for UAV", Electronic Design Engineering, vol. 27, No. 10, May 20, 2019(May 20, 2019), pp. 96-101.

Feng Guangsheng, Zhang Xiaoxue, Wang Huiqiang, Li Bingyang, Yuan Quan, Chen Shijun, Chen Dawei, "Classification method and updating mechanism of hierarchical 3D indoor map", Journal of Computer Applications, vol. 39, No. 1, Aug. 15, 2019(Aug. 15, 2019), pp. 78-81.

* cited by examiner predicating process training process predicating process training process predicating process training process predicating process noisy SIM
image deconvolved
SIM image denoised SIM image

SELF-SUPERVISED MICROSCOPIC IMAGE SUPER-RESOLUTION PROCESSING METHOD AND SYSTEM

CROSS-REFERENCE TO RELATED PATENT APPLICATION

This application is a continuation of International Application No. PCT/CN2024/100290, filed on Jun. 20, 2024, which claims the priority of the Chinese patent application No. 202310735660.3 filed with the China National Intellectual Property Administration on Jun. 20, 2023, the entire disclosure of which is incorporated herein by reference for all purposes.

FIELD OF THE DISCLOSURE

The disclosure relates generally to a method and a system for microscopy image super-resolution processing, and in particular to a method and a system for self-supervised microscopy image super-resolution processing.

BACKGROUND OF THE DISCLOSURE

Fluorescence microscopy imaging technology is an important tool for promoting the development of life science research. In recent years, super-resolution microscopy imaging technology has broken the limitation of the optical diffraction, enabling dynamic observation of fine structures in living cells with resolutions of less than 200 nanometers. However, hardware improvements for optical microscopy imaging systems in the prior art are approaching the limits. In this case, while observing biological samples using super-resolution microscopy imaging technology achieves an improvement in spatial resolution, it sacrifices other imaging performance indicators such as imaging speed and duration. These imaging performance indicators are equally important for research and analysis of biological sample processes. In recent years, computational super-resolution methods may immediately enhance the resolution of microscopy images via computation, thus significantly expanding the application scope of optical microscopy imaging systems.

SUMMARY OF THE DISCLOSURE

According to an aspect of the disclosure, a method for self-supervised microscopy image super-resolution processing is provided. The method includes: acquiring raw fluorescence image data of a biological sample using an optical imaging system; obtaining, depending on a type of the optical imaging system, a training set by performing image preprocessing on the raw fluorescence image data using a computer; training a neural network for performing denoising and super-resolution processing on an image in the computer using the training set, in which the neural network includes a denoising component and a deconvolution component, and the training set includes input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determining a denoising loss is based on the denoised image and the training target image; and determining a deconvolution loss based on the deconvolved image, after undergoing degradation processing depending on the type of the optical imaging system, and the training target image; in which during the training process of the neural network, a loss function includes the denoising loss and the deconvolution loss, or only includes the deconvolution loss; and processing the raw fluorescence image data using a trained neural network or processing additional fluorescence image data of a same biological sample acquired by the optical imaging system using a trained neural network.

According to another aspect of the disclosure, a system for self-supervised microscopy image super-resolution processing is provided. The system is configured to process raw fluorescence image data of a biological sample acquired by an optical imaging system and includes: a processor; and a memory storing computer-executable instructions that, when executed by the processor, cause the system to: obtain, depending on a type of the optical imaging system, a training set by performing image preprocessing on the raw fluorescence image data using a computer; and train, using the training set in the computer, a neural network for performing denoising and super-resolution processing on an image, in which the neural network comprises a denoising component and a deconvolution component; in which the training set includes input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determining a denoising loss based on the denoised image and the training target image; and determining a deconvolution loss based on the deconvolved image, after undergoing degradation processing depending on the type of the optical imaging system, and the training target image; in which during the training process of the neural network, a loss function includes the denoising loss and the deconvolution loss, or only includes the deconvolution loss; and the denoising and super-resolution reconstruction module is configured to process the raw fluorescence image data using a trained neural network or processing additional fluorescence image data of a same biological sample acquired by the optical imaging system using a trained neural network.

BRIEF DESCRIPTION OF THE DRAWINGS

The principles and various aspects of the disclosure may be understood more fully from the following detailed description in combination with the accompanying drawings below. It should be noted that proportions in the accompanying drawings may different for the purpose of clear illustration, but this does not affect the understanding of the disclosure.

Fluorescence microscopy imaging technology is an important tool for promoting the development of life science research. In recent years, super-resolution microscopy imaging technology has broken the limitation of the optical diffraction, enabling dynamic observation of fine structures in living cells with resolutions of less than 200 nanometers. However, hardware improvements for optical microscopy imaging systems in the prior art are approaching the limits. In this case, while observing biological samples using super-resolution microscopy imaging technology achieves an improvement in spatial resolution, it sacrifices other imaging performance indicators such as imaging speed and duration. These imaging performance indicators are equally important for research and analysis of biological sample processes. In recent years, computational super-resolution methods may immediately enhance the resolution of microscopy images via computation, thus significantly expanding the application scope of optical microscopy imaging systems.

Generally, existing computational super-resolution methods may be divided into two categories. A first category of methods includes a super-resolution algorithm based on a traditional analytical model, such as a deconvolution algorithm. A second category of methods includes a method based on deep learning, such as a super-resolution convolutional neural network. The first category of methods typically relies on a prior assumption about a biological sample and a microscopy fluorescence image, and uses a specific analytical model to iteratively optimize the resolution of the microscopy fluorescence image. However, such methods often involve a plurality of hyperparameters, and algorithm output largely depends on a selection of the parameters. Thus, users need to perform specific debugging of the parameters for each image to be processed, which is time-consuming and labor-intensive. Additionally, as validity of the priors for the biological sample or the microscopy fluorescence image cannot be guaranteed in practical experiments, such analytical algorithms lack robustness against noise in the microscopy fluorescence image, and is particularly prone to generating reconstruction artifacts under low signal-to-noise ratio input conditions. On the other hand, the super-resolution algorithm based on deep learning in recent years may learn an end-to-end mapping relationship between a high-resolution image and a low-resolution image from large amounts of high-quality training data. Thus, the resolution of microscopy image is enhanced without requiring physical modeling of the imaging or noise model, and a processing result may be achieved far surpassing a processing result of traditional analytical algorithms.

Figure 1:
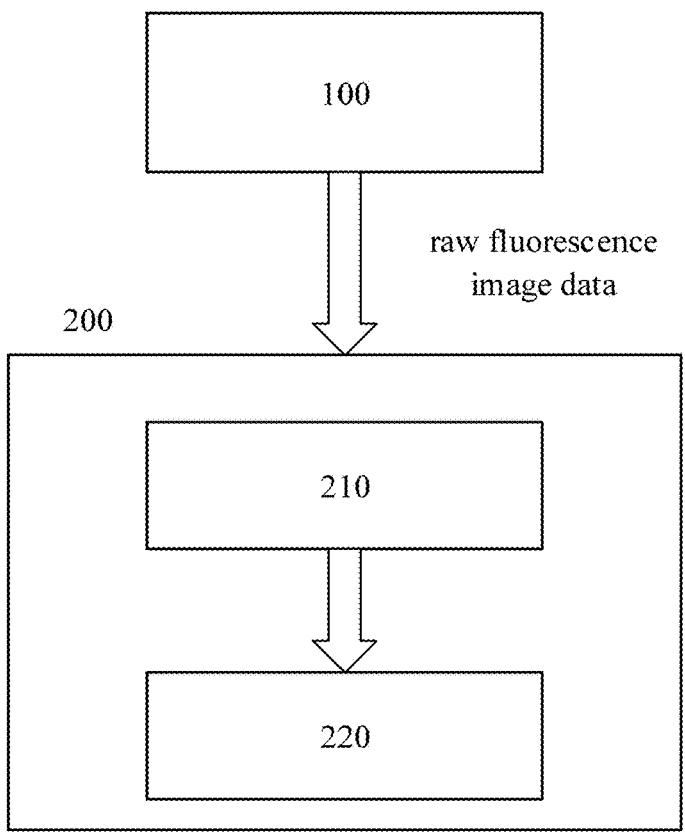

FIG. 1 is a block diagram illustrating a microscopy imaging system.

Figure 2A:
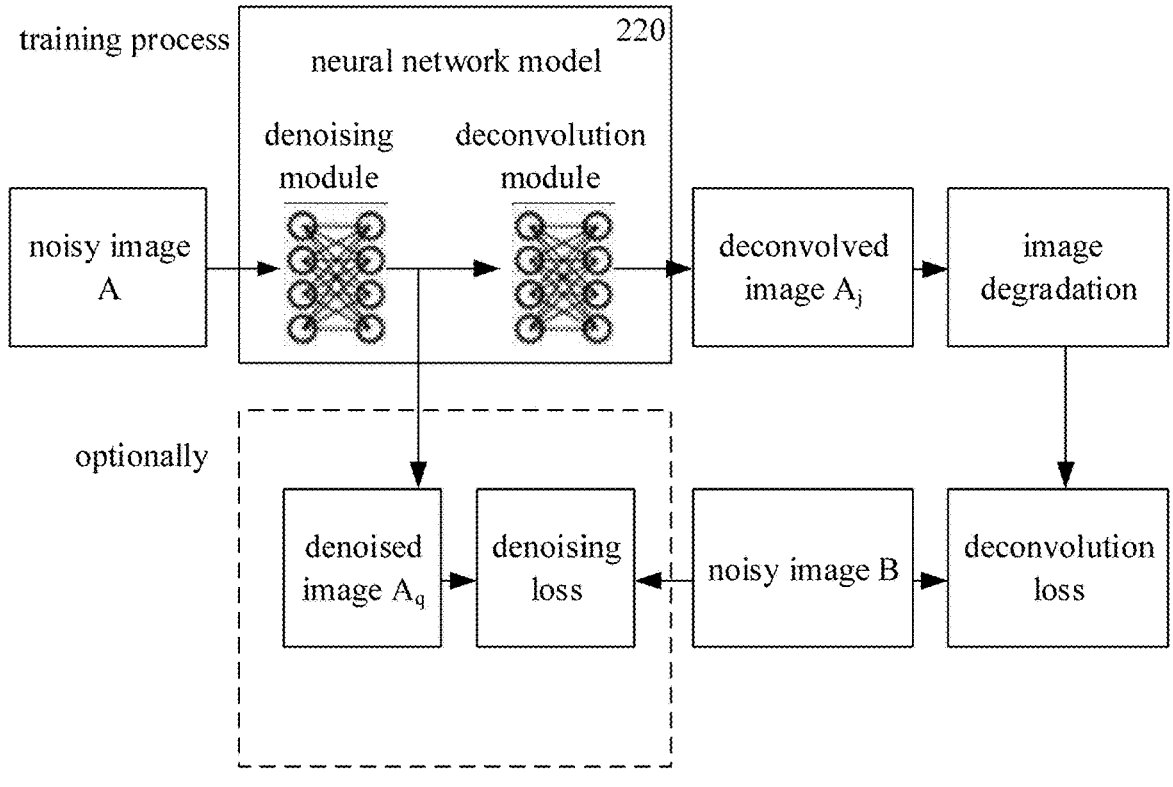

FIG. 2A is a schematic diagram illustrating a process of training a neural network of a denoising and super-resolution reconstruction module of a system for self-supervised microscopy image super-resolution processing according to an embodiment of the disclosure.

Figure 2B:
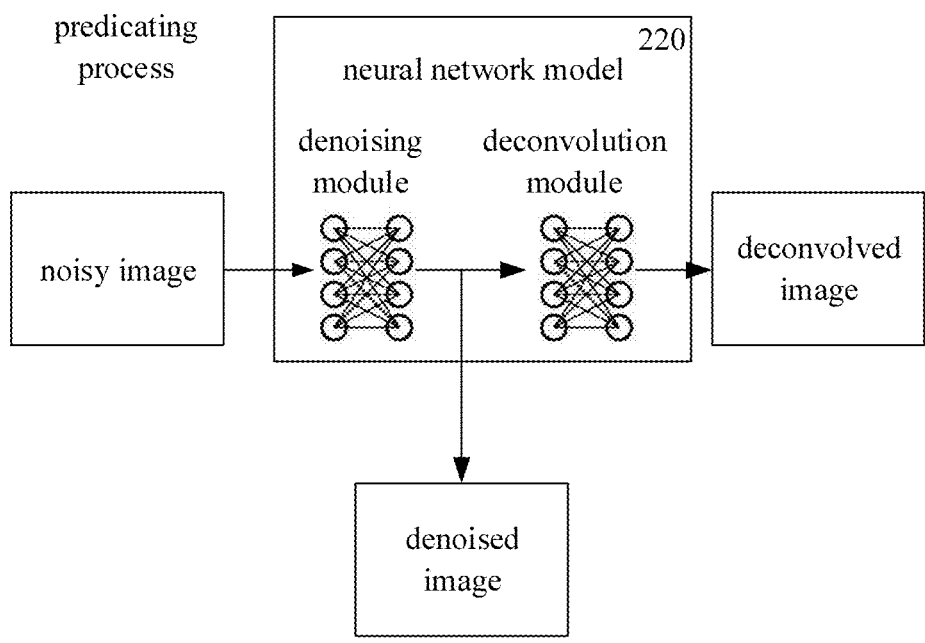

FIG. 2B is a schematic diagram illustrating a predicting process using the denoising and super-resolution reconstruction module with a trained neural network.

Figure 3A:
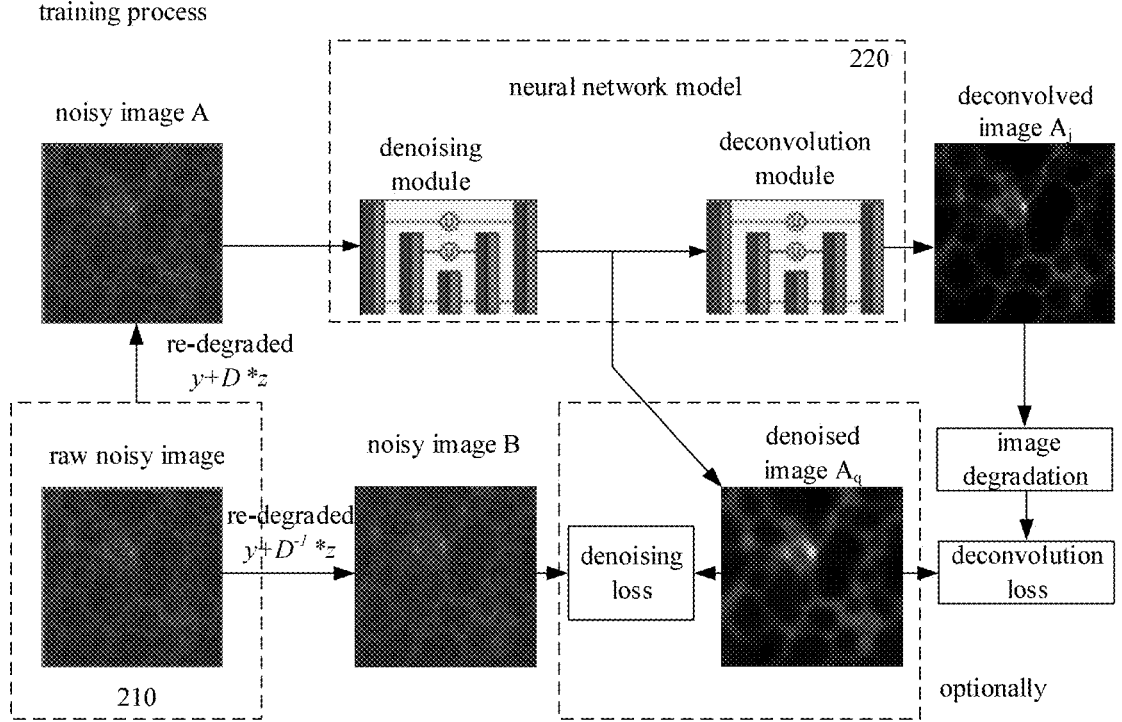

FIG. 3A is a schematic diagram illustrating a process of training the neural network of the denoising and super-resolution reconstruction module of the system for self-supervised microscopy image super-resolution processing according to another embodiment of the disclosure.

Figure 3B:
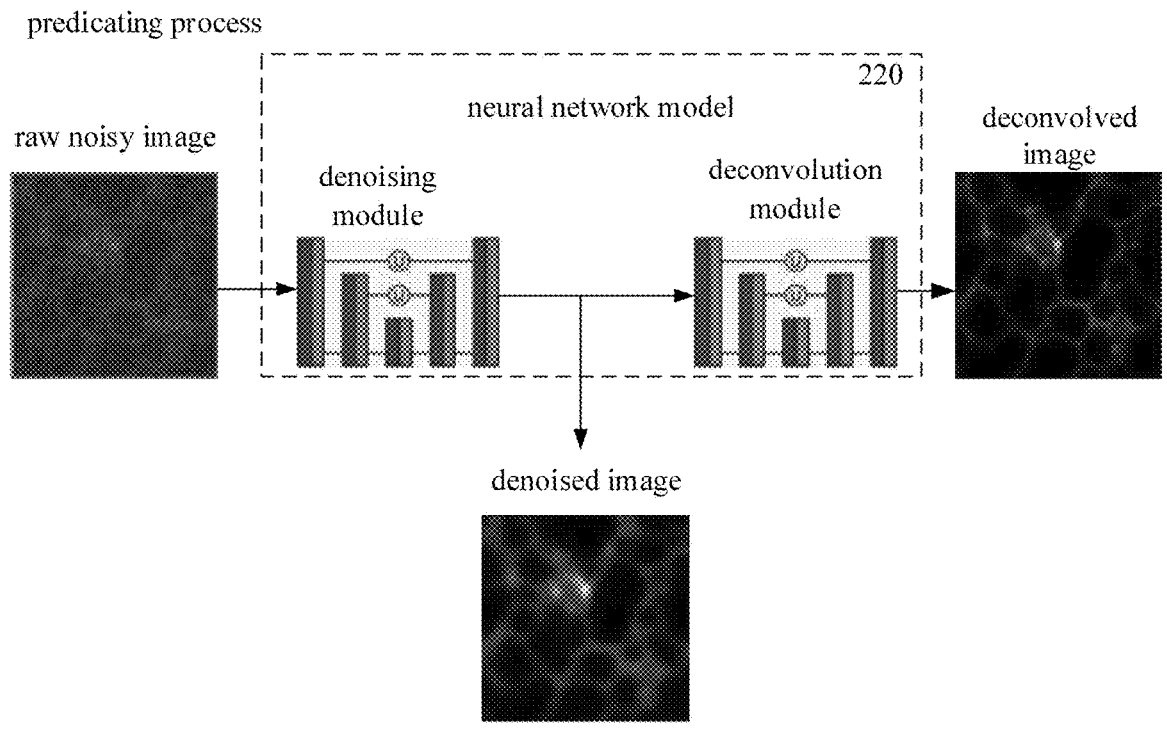

FIG. 3B is a schematic diagram illustrating a predicting process using the denoising and super-resolution reconstruction module with the trained neural network.

Figure 4A:
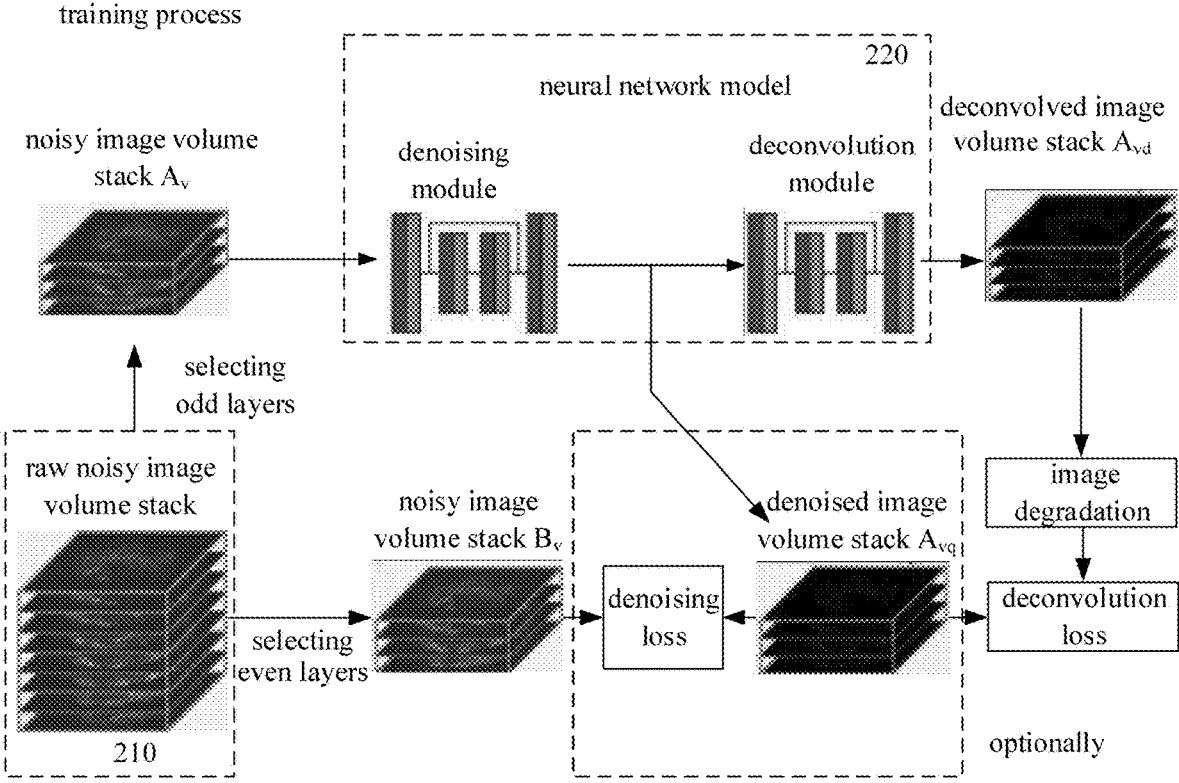

FIG. 4A is a schematic diagram illustrating a process of training the neural network of the denoising and super-resolution reconstruction module of the system for self-supervised microscopy image super-resolution processing according to another embodiment of the disclosure.

Figure 4B:
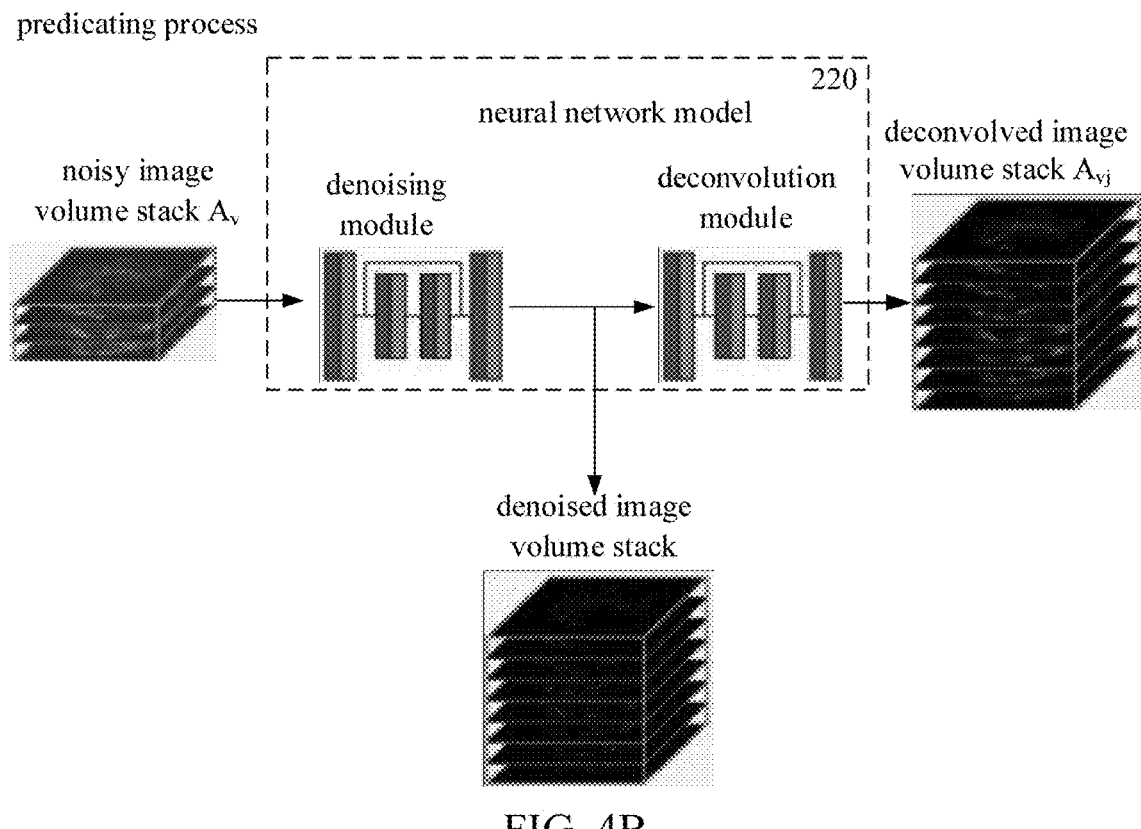

FIG. 4B is a schematic diagram illustrating a predicting process using the denoising and super-resolution reconstruction module with the trained neural network.

Figure 5A:
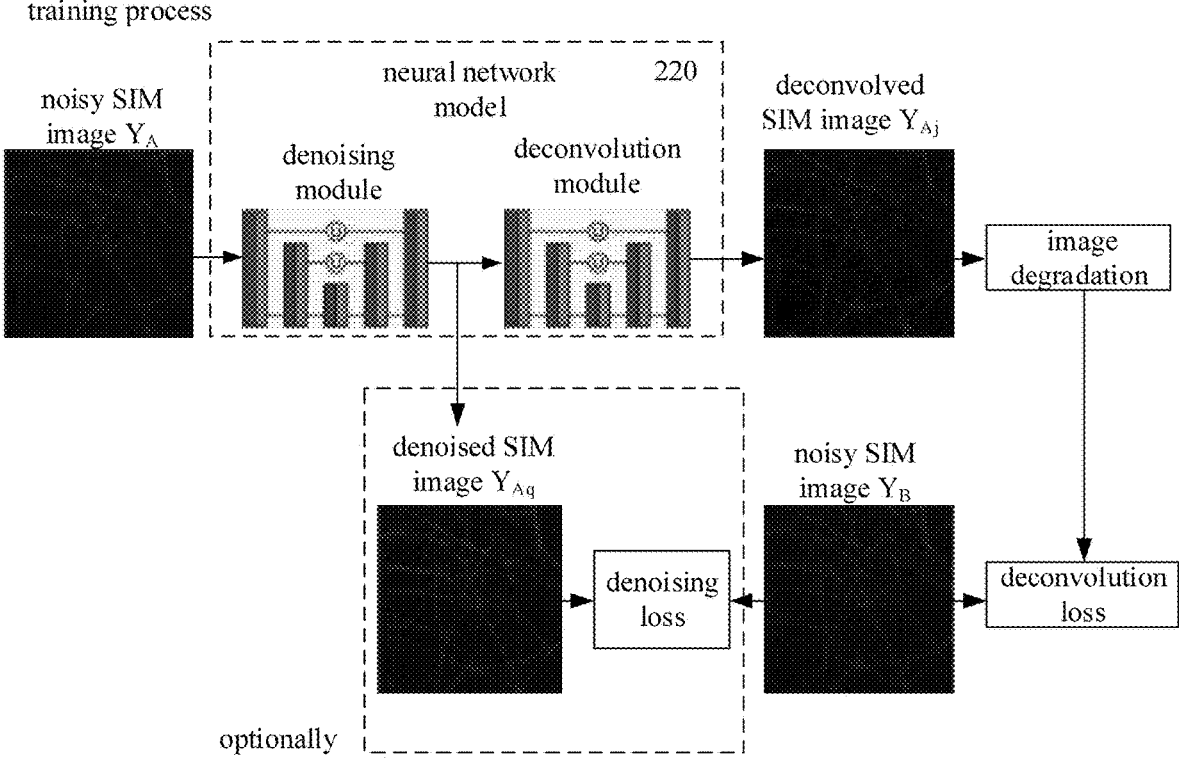

FIG. 5A is a schematic diagram illustrating a process of training the neural network of the denoising and super-resolution reconstruction module of the system for self-supervised microscopy image super-resolution processing according to another embodiment of the disclosure.

Figure 5B:
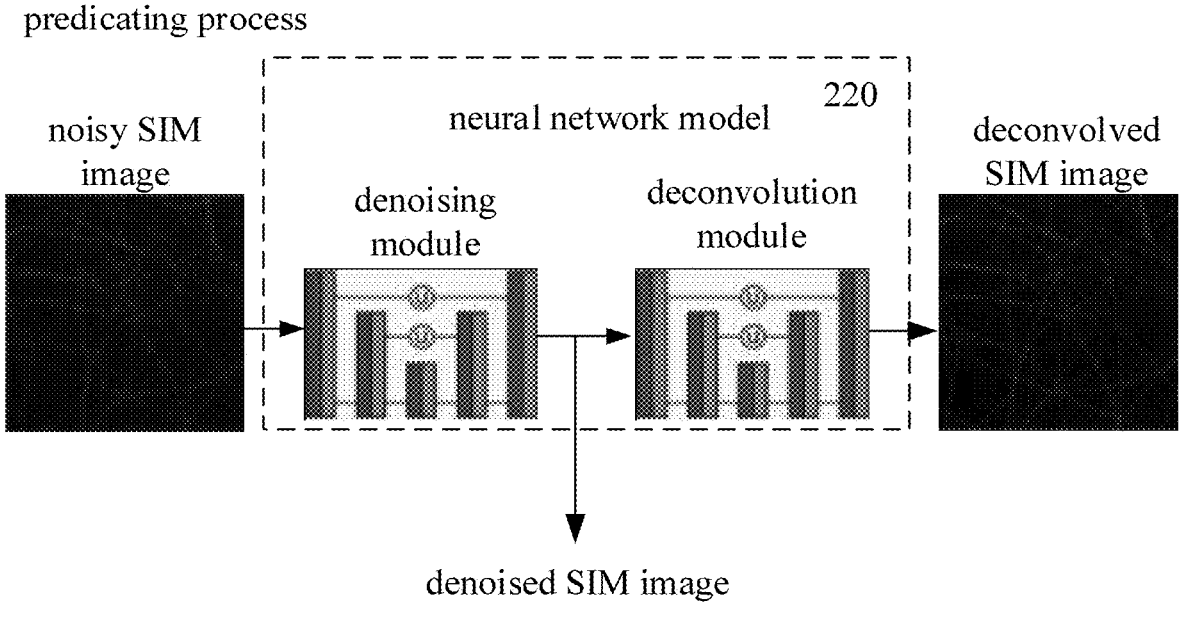
Figure 5B:
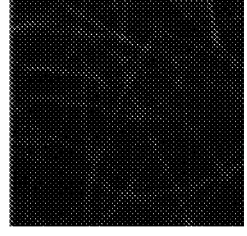

FIG. 5B is a schematic diagram illustrating a predicting process using the denoising and super-resolution reconstruction module with a trained neural network.

DETAILED DESCRIPTION OF THE EXEMPLARY EMBODIMENTS

In the accompanying drawings of the disclosure, features having the same structures or similar functions are denoted by the same reference numerals.

FIG. 1 is a block diagram illustrating a microscopy imaging system. The system generally includes an optical imaging system 100 and a control and data processing system 200. The optical imaging system 100 may be, but is not limited to, a wide-field microscopy imaging system, a scanning confocal microscopy imaging system, a light-sheet fluorescence microscopy imaging system, a two-photon scanning imaging system, or a structured illumination microscopy imaging system. For example, the optical imaging system 100 is the structured illumination microscopy imaging system, the optical imaging system 100 includes an excitation light path and a detection light path. The excitation light path includes an excitation objective and other optical components for generating excitation light. An excitation light beam may be emitted through the excitation objective to excite fluorescence in a biological sample. The detection light path includes a detection objective and other optical components for imaging, configured to receive and detect excited fluorescence. Those skilled in the art should understand that, depending on a configuration of the microscopy imaging system, the excitation objective and the detection objective may be a same objective or different objectives. The optical imaging system 100 may perform two-dimensional microscopy imaging or three-dimensional fluorescence microscopy imaging on the biological sample, particularly a living biological sample. When performing the three-dimensional fluorescence microscopy imaging on the biological sample, particularly the living biological sample, a plurality of layers of fluorescence images are continuously scanned and sampled along a direction of optical axis of the detection objective, i.e., an axial direction. Upon completion of each scan and sampling, a plurality of obtained layers of fluorescence images constitute a fluorescence image volume stack (which may also be referred to as a "sequence"). It should be noted that, in the context of the disclosure, depending on a requirement of the specific technical solution, the term "image" can be understood as a two-dimensional image stack or a three-dimensional image volume stack.

The control and data processing system 200 mainly includes a computer and related components (such as a data memory), and is capable of controlling the operation of the optical imaging system 100 and receiving image data from the optical imaging system 100 for corresponding post-processing. For example, an obtained fluorescence image volume stack is provided to the control and data processing system 200 and, after a series of data processing steps, is reconstructed into a high signal-to-noise ratio, super-resolution microscopy image. For this purpose, the control and data processing system 200 may include a microscopy image super-resolution processing module or system, or a self-supervised microscopy image super-resolution processing module or system. The microscopy image super-resolution processing module or system, or the self-supervised microscopy image super-resolution processing module or system, mainly includes a microscopy image preprocessing module 210 and a denoising and super-resolution reconstruction module 220. It should be noted that, within the scope of the disclosure, the modules and/or sub-modules described here may be understood to include a data memory, such as a computer-readable storage medium. The computer-readable storage medium may store programs or sub-programs and a denoising neural network model that may be called and executed by the computer, particularly the computer of the control and data processing system 200. When the programs or sub-programs and the denoising neural network model are called and executed by the computer, the methods/steps introduced below, particularly the method/steps for self-supervised microscopy image super-resolution processing may be implemented. The specific programming manner of the programs and/or sub-programs is not within the discussion of the disclosure, and those skilled in the art may implement the relevant functions using any well-known programming software and/or commercial software. Thus, the following description of the operation modules or methods of the relevant systems or in the disclosure should be understood as meaning that they may also be written as programs to be called and executed by the computer.

The microscopy image preprocessing module 210 is configured to obtain, by performing image preprocessing on a fluorescence image obtained by the optical imaging system 100, raw data for neural network training and predicting in the denoising and super-resolution reconstruction module 220. The processing methods include, but are not limited to, image re-degradation, axial spaced sampling, structured illumination super-resolution reconstruction, etc. For specific algorithms regarding the image re-degradation, the axial interval sampling, and the structured illumination super-resolution reconstruction, reference may be made to respective references: such as Pang, T., Zheng, H., Quan, Y. & Ji, H. in Proceedings of the IEEE/CVF Conference on Computer Vision and Pattern Recognition 2043-2052 (2021) (the image re-degradation); Qiao, C., Li, D., Liu, Y. et al. Rationalized deep learning super-resolution microscopy for sustained live imaging of rapid subcellular processes. Nature Biotechnology, 41, 367-377 (2023) (the axial spaced sampling); Gustafsson, M. G. et al. Three-dimensional resolution doubling in wide-field fluorescence microscopy by structured illumination. Biophys J 94, 4957-4970 (2008) (the structured illumination super-resolution reconstruction).

It should be noted that when the image re-degradation or the axial spaced sampling processing is performed on an image in the microscopy image preprocessing module 210, a targeted image (or image data) is two sets of noise-independent data pairs suitable for training from a single image directly obtained by the optical imaging system 100 or from a single three-dimensional image volume stack obtained by the optical imaging system 100, rather than paired training data directly obtained by the optical imaging system 100 (for example, high/low signal-to-noise ratio data pairs, or low/low signal-to-noise ratio data pairs obtained by independently sampling in a same scene). Further, it should be noted that when structured illumination super-resolution reconstruction is performed on an image in the microscopy image preprocessing module 210, the targeted image (or image data) is the raw fluorescence image data obtained by the optical imaging system 100 in a structured illumination manner, rather than the raw fluorescence image data obtained by the optical imaging system 100 in other imaging modalities (such as wide-field microscopy, scanning confocal microscopy, two-photon microscopy, light-sheet microscopy, etc.), the latter does not require structured illumination super-resolution reconstruction.

The denoising and super-resolution reconstruction module 220 may utilize any neural network architecture as a base model for implementation. For example, the neural network model used in the denoising and super-resolution reconstruction module 220 includes, but is not limited to, a U-shaped neural network model, a residual neural network model, a residual channel attention convolutional neural network model, or a Fourier channel attention convolutional neural network model. When training the neural network of the denoising and super-resolution reconstruction module 220, a loss function is used to optimize the relevant network model. The loss function includes, but is not limited to, mean squared error (MSE), mean absolute error (MAE), structural similarity (SSIM), or a weighted sum thereof.

Thus, the control and data processing system 200 may also be referred to as a microscopy image super-resolution processing system, which includes the microscopy image preprocessing module 210 and the denoising and super-resolution reconstruction module 220. FIG. 2A is a schematic diagram illustrating a process of training a neural network of the denoising and super-resolution reconstruction module 220 of the microscopy image super-resolution processing system using raw fluorescence images obtained by the optical imaging system 100 according to an embodiment of the disclosure. FIG. 2B is a schematic diagram illustrating a process of performing denoising and super-resolution processing on the raw fluorescence image obtained by the optical imaging system 100 using the microscopy image super-resolution processing system 200 with a trained neural network according to an embodiment of the disclosure.

Regarding FIG. 2A, a wide-field microscopy imaging system is used as an example of the optical imaging system 100 for description. Those skilled in the art should understand that other imaging system examples described in the disclosure are equally applicable. The optical imaging system 100 first performs two independent fluorescence image scans of a same biological sample to obtain a noisy image A and a noisy image B by sampling. The noisy image A and the noisy image B may also be referred to as raw fluorescence image data. Because two samplings are independent of each other, noise in the noisy image A and noise in the noisy image B is also independent of each other. If signal-to-noise ratios of the noisy image A and the noisy image B are the same, a neural network training mode described below corresponds to a noise-to-noise training mode. If a signal-to-noise ratio of the noisy image A is larger than a signal-to-noise ratio of the noisy image B, a neural network training mode described below corresponds to a supervised training mode.

According to an embodiment of the disclosure, the optical imaging system 100 may perform a plurality of samplings of the same biological sample at different times, thus obtaining a plurality of pairs of noisy images A/B distributed over time, which may constitute a training set for training the neural network of the denoising and super-resolution reconstruction module 220. In the training set, each pair of noisy images A/B is distinguished by time, and the noisy image A and the noisy image B in each pair are in a one-to-one correspondence with each other. Within the scope of the disclosure, the term "one-to-one correspondence" means that when training the neural network, if the noisy image A or the noisy image B in the pair of noisy images A/B is selected as a training input, then the noisy image B in a same pair of noisy images A/B serves as a training ground truth.

In an alternative embodiment of the disclosure, the pair of noisy images A/B may further be obtained from a single independent noisy image using data augmentation methods such as image re-degradation, axial spaced sampling (applied to three-dimensional data), and the like, provided that the noise in the noisy image A and the noisy image B in the pair is independently distributed from each other. In another alternative embodiment of the disclosure, if the optical imaging system 100 is a structured illumination microscopy imaging system, the noisy image A and the noisy image B shown in FIG. 2A and FIG. 2B refer to structured illumination super-resolution images obtained by performing structured illumination super-resolution reconstruction on the acquired raw microscopy fluorescence images.

Returning to FIG. 2A, the plurality of pairs of noisy images A/B are randomly selected from the training set to train the neural network of the denoising and super-resolution reconstruction module 220. For example, in each selected pair of noisy images A/B, the noisy image A is used as training input image data, and the noisy image B is used as training ground truth image data. In each training period, for a selected noisy image A and a selected noisy image B with the one-to-one correspondence, pixel blocks at a same position are randomly extracted and subjected to random rotation and flipping to serve as a training input image and a training target image of the neural network respectively.

The neural network of the denoising and super-resolution reconstruction module 220 includes two components, namely a denoising component and a deconvolution component. The denoising component is configured to perform denoising processing on the input noisy image A, and output a denoised image $A_q$. The deconvolution component is configured to perform deconvolution processing on the denoised image $A_q$, and output a deconvolved image $A_j$. Correspondingly, in the training process, a loss function of the neural network may include a denoising loss and a deconvolution loss. The denoising loss represents a difference between the denoised image $A_q$ and the noisy image B. The deconvolution loss represents a difference between a degraded version of the deconvolved image $A_j$ and the noisy image B. Particularly for this embodiment, the deconvolved image $A_j$ should first undergo degradation processing, namely, namely, first be convolved with a point spread function of the optical imaging system 100, and then a difference between a convolved result and the noisy image B is determined. The method for determining the difference includes, but is not limited to, MSE, MAE, SSIM, or a weighted sum thereof.

In an alternative embodiment of the disclosure, considering the balance among various factors such as computation time and result accuracy, calculation of the denoising loss may also be omitted. That is, during training of the neural network, the loss function may further retain only the deconvolution loss, which may also achieve the training of the neural network of the denoising and super-resolution reconstruction module 220. In this mode, although only the deconvolved image may be output, the network efficiency and operation speed may be improved by reducing scale of neural network parameters.

In each iteration of the training of the neural network, gradient is determined based on the loss function, and the gradient is backpropagated to update the network parameters. When a network input error converges, training is stopped and the neural network parameters are stored. It may be seen that when using the above neural network training method of the disclosure, high signal-to-noise ratio, high resolution ground truth images are not required, thus it may also be regarded as a self-supervised training.

After the neural network of the denoising and super-resolution reconstruction module 220 is trained, the microscopy image super-resolution processing system may perform denoising and super-resolution reconstruction (or prediction) on the raw fluorescence image sequence obtained by the optical imaging system 100, as shown in FIG. 2B. A noisy image is used as an input to the neural network of the denoising and super-resolution reconstruction module 220 to obtain a final denoised and super-resolution image. If the denoising and super-resolution reconstruction is to be performed on a plurality of raw fluorescence images, the processing may be repeated for each raw fluorescence image.

FIG. 3A and FIG. 3B are two schematic diagrams illustrating a method for microscopy image super-resolution processing according to an embodiment of the disclosure. In the illustrated embodiment, the optical imaging system 100 is a two-dimensional wide-field microscope, and a training set for training the neural network of the denoising and super-resolution reconstruction module 220 consists of a plurality of two-dimensional noisy images (two-dimensional images containing noise). In the illustrated embodiment, before training the neural network of the denoising and super-resolution reconstruction module 220, the microscopy image preprocessing module 210 may be used to perform image re-degradation processing on each or any other number of the plurality of two-dimensional noisy images (or referred to as the raw fluorescence image data) of the biological sample acquired by the optical imaging system 100, to generate a plurality of pairs of training noisy images A/B as a training set. Each pair of noisy images A/B includes a noisy image A and a noisy image B with the one-to-one correspondence. An example of the image re-degradation processing is as follows.

Assume there is one two-dimensional noisy image y, a normal distribution random variable z with a same image dimension (or image pixel size) with the two-dimensional noisy image y and satisfy a mean of 0 and a variance of 1 may be randomly generated using a computer. Then, based on each raw fluorescence image y, a pair of fluorescence-perturbed images (also referred to as re-degraded images) $y_A$ and $y_B$ are generated using following formulas.

$$\Sigma = \sqrt{\beta_1 y + \beta_2} \qquad (1)$$

$$y_A = y + \alpha \cdot \Sigma \cdot z \qquad (2)$$

$$y_B = y - \alpha^{-1} \cdot \Sigma \cdot z \qquad (3)$$

In the above formulas (1), (2), (3), $\alpha$, $\beta_1$, $\beta_2$ are constants randomly generated by a computer within ranges specified in Table 1 below. In Table 1, $\sigma^2$ is bottom noise variance of a camera used in a selected optical imaging system 100. Value ranges of $\alpha$, $\beta_1$, and $\beta_2$ in Table 1 are provided for the example only and may be adjusted as needed in other application scenarios.

TABLE 1

| parameter ranges used in "image perturbation" | | | |
|---|---|---|---|
| parameter | $\alpha$ | $\beta_1$ | $\beta_2$ |
| ranges | 0.2~5.0 | 0.2~5 | $0.5\sigma^2$~$1.5\sigma^2$– |

Within the scope of the disclosure, the terms "image y" or "image $y_A$ or $y_B$" may be mathematically understood as a two-dimensional matrix representing an image observable by a human eye. Thus, multiplication operations related to images or matrices in the above formulas should be understood as element-wise multiplication.

For selected raw fluorescence images obtained using the optical imaging system 100, formulas (1) to (3) are repeatedly applied to perform the image re-degradation processing on each raw noisy image. Thus, all generated re-degraded images $y_A$ constitute a training input image data set, and all generated re-degraded images $y_B$ constitute a training ground truth image data set. Alternatively, all generated re-degraded images $y_A$ may constitute the training ground truth image dataset, and all generated re-degraded images $y_B$ may constitute the training input image dataset. It should be noted that after each image re-degradation process, one re-degraded image $y_A$ and one re-degraded image $y_B$ form a one-to-one correspondence. This means that when the one re-degraded image $y_A$ is selected as the input image data during the training of the neural network, the one re-degraded image $y_B$ may be selected as the ground truth image data.

Based on the above input image data set and the ground truth image data set, the neural network of the denoising and super-resolution reconstruction module 220 is trained. For example, as shown in FIG. 3A, in each training period, re-degraded images $y_A$ and $y_B$ with a one-to-one correspondence are randomly taken from the training input data set and the training ground truth data set to serve as the input image data and the ground truth image data respectively, pixel blocks at a same position within the re-degraded images $y_A$ and $y_B$ are randomly extracted and subjected to random rotation and flipping to serve as the training input image and the training target image for the neural network respectively. In the illustrated embodiment, a basic neural network architecture may be selected, for example, as a U-shaped neural network; that is, both the denoising component and the deconvolution component each employ a U-shaped neural network. The denoising component outputs a denoised image $A_q$, and a denoising loss is determined using the denoised image $A_q$ and the noisy image B. The deconvolution component outputs a deconvolved image $A_j$. It should be noted that for generating the training input image data set and the training ground truth image data set using the "image re-degradation" method, before determining the deconvolution loss, the deconvolved image $A_j$ must undergo degradation processing, namely, the deconvolved image $A_j$ is first convolved with a point spread function of the optical imaging system 100, and then a convolution result is used with the noisy image B to determine the deconvolution loss. In each training iteration, training of the neural network is completed via loss calculation (for example, using both the denoising loss and the deconvolution loss, or using only the deconvolution loss) and backpropagation. When using the "image re-degradation" method to train the neural network of the denoising and super-resolution reconstruction module 220, since the network training may be completed using only a raw fluorescence image sequence obtained in a single instance, damage to living cells due to a plurality of samplings is avoided. Further, as a plurality of acquisitions are not required, data intended for video observation and recording of living cells may be processed.

After the neural network of the denoising and super-resolution reconstruction module 220 is trained, the trained neural network may be configured to perform the denoising and super-resolution processing on noisy images that are not selected for training from the training set or on newly sampled noisy images (i.e., noisy images not part of the training set), as shown in FIG. 3B.

FIG. 4A and FIG. 4B are two schematic diagrams illustrating a method for microscopy image super-resolution processing according to another embodiment of the disclosure. In the embodiment, the optical imaging system 100 is a light-sheet fluorescence microscopy imaging system. Before training the neural network of the denoising and super-resolution reconstruction module 220, the optical imaging system 100 is configured to acquire a plurality of three-dimensional noisy image volume stacks (three-dimensional image volume stacks including noise, also referred to as the raw fluorescence image data). As shown in FIG. 4A, one three-dimensional noisy image volume stack (i.e., raw noise image volume stack) undergoes axial spaced sampling processing in the microscopy image preprocessing module 210 and is augmented into a noisy image volume stack $A_v$ (odd layers of the raw noisy image volume stack or even layers of the raw noisy image volume stack) and a noisy image volume stack $B_v$ (odd layers of the raw noisy image volume stack or even layers of the raw noisy image volume stack). Subsequently, during the training of the neural network of the denoising and super-resolution reconstruction module 220, the noisy image volume stack $A_v$ and the noisy image volume stack $B_v$ are used as the input image data and the ground truth image data respectively, to calculate the denoising loss and the deconvolution loss, or only the deconvolution loss. In the illustrated embodiment, the neural network model adopts a three-dimensional residual channel attention neural network architecture. The denoising component outputs a denoised image volume stack $A_{vq}$ and the deconvolution component outputs a deconvolved image volume stack Ard. For example, the denoised image volume stack $A_{vq}$ and the noisy image volume stack $B_v$ may be used to calculate the denoising loss. Before determining the deconvolution loss, the denoised image volume stack $A_{vq}$ must undergo degradation processing, namely, the denoised image volume stack $A_{vq}$ is convolved with the three-dimensional point spread function of the optical imaging system 100, and a resulting convolved image volume stack is then used with the noisy image volume stack Bv to calculate an error, thus obtaining the deconvolution loss. In each iteration of the training, the denoising loss and the deconvolution loss (or only the deconvolution loss) are used to calculate the gradient, and weights of neural network are updated based on backpropagation, thus completing the training process.

As shown in FIG. 4B, after the neural network of the denoising and super-resolution reconstruction module 220 is trained, the raw noisy image volume stack is used as the input. The trained neural network of the denoising and super-resolution reconstruction module 220 may simultaneously output a corresponding denoised image volume stack and a corresponding deconvolved image volume stack, thus achieving enhancement in signal-to-noise ratio and resolution compared to the raw data.

FIG. 5A and FIG. 5B are two schematic diagrams illustrating a method for microscopy image super-resolution processing according to another embodiment of the disclosure. In the embodiment, the optical imaging system 100 is a structured illumination super-resolution microscopy imaging system, and the microscopy image preprocessing module 210 is configured to perform structured illumination super-resolution reconstruction on raw structured illumination images acquired by the optical imaging system 100. Thus, in a training process shown in FIG. 5A, a "noise-tonoise" training mode is adopted to train the neural network of the denoising and super-resolution reconstruction module 220. Specifically, before preparing data for training the neural network of the denoising and super-resolution reconstruction module 220, two sets of structured illumination raw image sequences $y_{A,i}$ and $y_{B,i}$ of the biological sample or of each structural region of the biological sample are acquired independently, where i is an integer greater than 1. Then, the microscopy image preprocessing module 210 is configured to reconstruct the structured illumination raw image sequences $y_{A,i}$ and $y_{B,i}$ into noisy structured illumination super-resolution images $Y_A$ and $Y_B$ respectively, which serve as training images. Subsequently, during the training of the neural network of the denoising and super-resolution reconstruction module 220, the noisy structured illumination super-resolution image (or noisy SIM images) $Y_A$ and $Y_B$ are used as the input image data and the ground truth image data for the training of the neural network respectively, to calculate a network loss (for example, the denoising loss and the deconvolution loss, or only the deconvolution loss), thus completing gradient calculation and network weight updates. In the embodiment, a selection of the neural network model and the calculation of the loss function are similar to the embodiment shown in FIG. 3A and FIG. 3B. In each training period, pixel blocks at the same position are randomly extracted from the noisy structured illumination super-resolution images $Y_A$ and $Y_B$ and are subjected to random rotation and flipping to serve as the training input image and the training target image for the neural network respectively. In the illustrated embodiment, a basic neural network architecture may be selected, for example, as a U-shaped neural network; that is, both the denoising component and the deconvolution component each employ a U-shaped neural network. The denoising component outputs a denoised SIM image $Y_{Aq}$, and a denoising loss is calculated using the denoised SIM image $Y_{Aq}$ and the noisy SIM image $Y_B$. The deconvolution component outputs a deconvolved SIM image $Y_{Aj}$. When performing degradation processing on the deconvolved SIM image $Y_{Aj}$ before calculating the deconvolution loss, the point spread function used is not the point spread function of the optical imaging system 100, but rather a super-resolution point spread function should be used (i.e., with a full width at half maximum approximately half that of the wide-field point spread function, not the point spread function under wide-field illumination). Then, the deconvolution loss is calculated between a degraded version of the deconvolved SIM image $Y_{Aj}$ and the noisy SIM image $Y_B$.

As shown in FIG. 5B, after the neural network of the denoising and super-resolution reconstruction module 220 is trained, for a noisy structured illumination raw image requiring denoising and super-resolution processing, the noisy structured illumination raw image is first reconstructed into a noisy structured illumination super-resolution image using the microscopy image preprocessing module 210. The noisy structured illumination super-resolution image is then input into the trained neural network of the denoising and super-resolution reconstruction module 220, thus completing the denoising and resolution enhancement processing of the structured illumination super-resolution image.

In an alternative embodiment corresponding to the embodiment shown in FIG. 5A, before preparing the data for training the neural network of the denoising and super-resolution reconstruction module 220, only one set of structured illumination raw image sequences may be acquired of the biological sample or for each structural region of the biological sample. Then, using formulas (1), (2), and (3), image re-degradation processing is applied such that a pair of re-degraded images $y_A$ and $y_B$ is generated based on each structured illumination raw image or a plurality of structured illumination raw images in the set of structured illumination raw image sequences respectively, thus producing a plurality of pairs of re-degraded images. A re-degraded image $y_A$ is extracted from each pair of re-degraded images to form a structured illumination raw image sequence $y_{A,i'}$ and a re-degraded image $y_B$ is extracted from each pair of re-degraded images to form a structured illumination raw image sequence $y_{B,i'}$ where i is an integer greater than 1. The microscopy image preprocessing module 210 is used to reconstruct the structured illumination raw image sequence $y_{A,i}$ into a noisy structured illumination super-resolution image $Y_A$ serving as a training image and reconstruct the structured illumination raw image sequence $y_{B,i}$ into a noisy structured illumination super-resolution image $Y_B$ serving as a training image. Training of the neural network of the denoising and super-resolution reconstruction module 220 in the alternative embodiment may refer to the content shown in FIG. 5A. After the neural network of the denoising and super-resolution reconstruction module 220 is trained, the noisy structured illumination raw images requiring denoising and super-resolution processing may refer to content shown in FIG. 5B.

From the above description in the disclosure, it may be seen that for the embodiments shown in FIG. 3A, FIG. 3B and FIG. 4A, FIG. 4B, during a training process of the neural network, the raw fluorescence image data must first be processed by the microscopy image preprocessing module 210 before being used for the training of the neural network. In a prediction process, only the raw fluorescence image data needs to be input into the denoising and super-resolution reconstruction module 220 with the trained neural network to obtain a final denoised and super-resolution processed image. For the embodiments shown in FIG. 5A, and FIG. 5B, during the training of the neural network, the raw fluorescence image data must also first be processed by the microscopy image preprocessing module 210 before being used for training. However, in the predicting process, the raw fluorescence image data still needs to be processed by the microscopy image preprocessing module 210 first and then input into the denoising and super-resolution reconstruction module 220 to obtain the final denoised and super-resolution processed image.

From the above description in the disclosure, the disclosure provides a method for self-supervised microscopy image super-resolution processing. The method includes: acquiring raw fluorescence image data of a biological sample using an optical imaging system 100; obtaining, depending on a type of the optical imaging system 100, a training set by performing image preprocessing on the raw fluorescence image data using a computer; training a neural network for performing denoising and super-resolution processing on an image in the computer using the training set, in which the neural network includes a denoising component and a deconvolution component, and the training set includes input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determining a denoising loss based on the denoised image and the training target image, and determining a deconvolution loss based on the deconvolved image, after undergoing degradation processing depending on the type of the optical imaging system 100, and the training target image to determine a deconvolution loss; and during a training process of the neural network, a loss function includes the denoising loss and the deconvolution loss, or only includes the deconvolution loss; and processing the raw fluorescence image data using a trained neural network or processing additional fluorescence image data of a same biological sample acquired by the optical imaging system 100 using a trained neural network.

In addition, the disclosure further provides a system for self-supervised microscopy image super-resolution processing. The system is configured to process raw fluorescence image data of a biological sample using an optical imaging system 100, including: a microscopy image preprocessing module 210; and a denoising and super-resolution reconstruction module 220, in which the microscopy image preprocessing module 210 is configured to obtain, depending on a type of the optical imaging system, a training set by performing image preprocessing on the raw fluorescence image data using a computer, and the denoising and super-resolution reconstruction module 220 is configured with a neural network for performing denoising and super-resolution processing on an image, the neural network includes a denoising component and a deconvolution component, the neural network is trained using the training set in the computer, in which the training set includes input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; a denoising loss is determined based on the denoised image and the training target image, and a deconvolution loss is determined based on the deconvolved image, after undergoing degradation processing depending on the type of the optical imaging system 100, and the training target image; and during a training process of the neural network, a loss function includes the denoising loss and the deconvolution loss, or only includes the deconvolution loss; and the denoising and super-resolution reconstruction module 220 is configured to process the raw fluorescence image data using a trained neural network or processing additional fluorescence image data of a same biological sample acquired by the optical imaging system 100 using a trained neural network.

In addition, the disclosure further provides a system for self-supervised microscopy image super-resolution processing, configured to process raw fluorescence image data of a biological sample acquired by an optical imaging system 100; comprising: a computer; in which the computer is configured to: obtain, depending on a type of the optical imaging system 100, a training set by performing image preprocessing on the raw fluorescence image data using a computer; train, using the training set in the computer, a neural network for performing denoising and super-resolution processing on an image, wherein the neural network comprises a denoising component and a deconvolution component, in which the training set comprises input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determine a denoising loss using the denoised image and the training target image, and determine a deconvolution loss based on the deconvolved image, after undergoing degradation processing depending on the type of the optical imaging system 100, and the training target image; wherein during the training process of the neural network, a loss function comprises the denoising loss and the deconvolution loss, or only comprises the deconvolution loss; and process the raw fluorescence image data using a trained neural network or process additional fluorescence image data of a same biological sample acquired by the optical imaging system 100 using a trained neural network.

The main advantages of the technical solution of the disclosure are as follows.

(1) The technical solution of the disclosure may complete training of a super-resolution neural network model without requiring high and low signal-to-noise ratio data pairs.

(2) The disclosure uses two microscopy images (volume stacks) with mutually independent noise as an input and a ground truth for training of the neural network respectively. Thus, image denoising is completed while enhancing image resolution, thereby exhibiting strong noise robustness.

(3) The technical solution of the disclosure may be applied to various different microscopy imaging systems, enabling multi-modal denoising and super-resolution imaging.

(4) Based on data augmentation methods such as image re-degradation and axial spaced sampling, the technical solution of the disclosure may be directly applied to long-term video data. It directly constructs a training set from the data and performs the denoising and super-resolution processing on the data, which offers significant ease of use.

A diffraction-limited resolution of traditional wide-field optical microscopes is approximately 200 nanometers. The microscopy image processed using the above self-supervised denoising and super-resolution scheme of the disclosure may achieve a resolution enhanced to approximately 120 nanometers. That is, the optical resolution of the microscopy image may be improved by more than 1.5 times. In particular, for super-resolution microscopy imaging techniques such as structured illumination microscopy, the technology of the disclosure may further enhance the resolution beyond their baseline. For example, the structured illumination super-resolution microscopy imaging technology offers a resolution of about 100 nanometers, the technology of the disclosure may further improve the resolution to approximately 60 nanometers.

In summary, the disclosure designs a novel self-supervised denoising and super-resolution processing scheme. Without the need for high signal-to-noise ratio, high-resolution data, it improves the optical resolution of microscopy images by more than 1.5 times. The output result possess high fidelity and quantifiable characteristics. Further, when applied to different biological samples or data with different signal-to-noise ratios, specific adjustment of hyperparameters is not required. Thus, the application scope of computational super-resolution methods is greatly expanded.

Although specific embodiments of the disclosure have been described in detail here, they are provided solely for the purpose of explanation and should not be construed as limiting the scope of the disclosure. Further, those skilled in the art should understand that the various embodiments described in the specification may be used in combination with each other. Various substitutions, modifications, and alterations may be conceived without departing from the spirit and scope of the disclosure.

What is claimed is:

1. A method for self-supervised microscopy image super-resolution processing, comprising:

acquiring raw fluorescence image data of a biological sample using an optical imaging system;

obtaining, depending on a type of the optical imaging system, a training set by performing image preprocessing on the acquired raw fluorescence image data using a computer; and training a neural network for performing denoising and super-resolution processing on an image in the computer using the training set, wherein the neural network comprises a denoising component and a deconvolution component, and the training set comprises input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determining a denoising loss based on the denoised image and the training target image, and determining a deconvolution loss based on the deconvolved image, after undergoing degradation processing depending on the type of the optical imaging system, and the training target image; wherein during the training process of the neural network, a loss function comprises the denoising loss and the deconvolution loss, or only comprises the deconvolution loss; and processing the raw fluorescence image data using a trained neural network or processing additional fluorescence image data of a same biological sample acquired by the optical imaging system using a trained neural network.

2. The method according to claim 1, wherein in a case that the optical imaging system is a wide-field microscopy imaging system, a scanning confocal microscopy imaging system, a light-sheet fluorescence microscopy imaging system, or a two-photon scanning imaging system, the raw fluorescence image data is one or a plurality of two-dimensional noisy images of the biological sample independently acquired by the optical imaging system, and the training set comprises a plurality of pairs of training noisy images, and the plurality of pairs of training noisy images are generated by performing image re-degradation processing on the raw fluorescence image data;

the image re-degradation processing comprises:

for one two-dimensional noisy image, randomly generating, using the computer, a normal distribution random variable with a same image dimension with the two-dimensional noisy image and satisfying a mean of 0 and a variance of 1, and generating a pair of fluorescence-perturbed images using following formulas:

$$\Sigma = \sqrt{\beta_1 y + \beta_2} \tag{1}$$

-continued $$y_A = y + \alpha \cdot \Sigma \cdot z \tag{2}$$

$$y_B = y - \alpha^{-1} \cdot \Sigma \cdot z \tag{3}$$

where, $\alpha$, $\beta_1$, $\beta_2$ are constants randomly generated by the computer, and $\alpha=0.2\sim5.0$, $\beta_1=0.2\sim5$, $\beta_2=0.5\sigma^2\sim1.5\sigma^2$, y represents the two-dimensional noisy image, z represents the normal distribution random variable, $y_A$ represents one fluorescence-perturbed image in the pair of fluorescence-perturbed images, $y_B$ represents the other fluorescence-perturbed image in the pair of fluorescence-perturbed images, $\sigma^2$ is bottom noise variance of a camera used in the optical imaging system, and the pair of fluorescence-perturbed images constitutes one pair of training noisy images;

during training of the neural network, selecting one noisy image from one pair of training noisy images among the plurality of pairs of training noisy images as the input image data, and selecting the other noisy image from the selected pair of training noisy images as the ground truth input image data; and after the training of the neural network, processing the two-dimensional noisy image of the biological sample acquired by the optical imaging system using the trained neural network or processing the raw fluorescence image data using the trained neural network.

3. The method according to claim 2, wherein during the training of the neural network, the degradation processing of the deconvolved image comprises a convolution of the deconvolved image with a point spread function of the optical imaging system.

4. The method according to claim 1, wherein in a case that the optical imaging system is a wide-field microscopy imaging system, a scanning confocal microscopy imaging system, a light-sheet fluorescence microscopy imaging system, or a two-photon scanning imaging system, the raw fluorescence image data is a three-dimensional noisy image volume stack of the biological sample independently acquired by the optical imaging system, the training set comprises a first noisy image volume stack and a second noisy image volume stack augmented from the three-dimensional noisy image volume stack via axial spaced sampling processing, and the denoised image is a denoised image volume stack and the deconvolved image is a deconvolved image volume stack;

the axial spaced sampling processing comprises: for the three-dimensional noisy image volume stack independently acquired by the optical imaging system, extracting odd layers or even layers of the three-dimensional noisy image volume stack as the first noisy image volume stack, and correspondingly extracting even layers or odd layers of the three-dimensional noisy image volume stack as the second noisy image volume stack;

during training of the neural network, selecting one from the first noisy image volume stack and the second noisy image volume stack with a one-to-one correspondence as the input image data, and selecting the other from the first noisy image volume stack and the second noisy image volume stack with the one-to-one correspondence as the ground truth image data; and after the training of the neural network, processing the three-dimensional noisy image volume stack of the biological sample acquired by the optical imaging system using the trained neural network or processing the raw fluorescence image data using the trained neural network.

5. The method according to claim 4, wherein during the training of the neural network, the degradation processing of the deconvolved image comprises a convolution of a deconvolved image volume stack with a three-dimensional point spread function of the optical imaging system.

6. The method according to claim 1, wherein in a case that the optical imaging system is a structured illumination super-resolution microscopy imaging system, the raw fluorescence image data is a structured illumination image of the biological sample acquired by the optical imaging system, and the training set comprises two structured illumination super-resolution images, wherein the structured illumination super-resolution images are obtained by performing structured illumination super-resolution reconstruction on the structured illumination image;

during training of the neural network, one of the two structured illumination super-resolution images is served as the input image data, and the other of the two structured illumination super-resolution images is served as the ground truth image data; and after the training of the neural network, the structured illumination image of the biological sample acquired by the optical imaging system is processed using the trained neural network, wherein the structured illumination super-resolution reconstruction is performed on the structured illumination image.

7. The method according to claim 6, wherein the two structured illumination super-resolution images are generated by performing the structured illumination super-resolution reconstruction on two sets of structured illumination raw image sequences of the biological sample independently acquired by the optical imaging system.

8. The method according to claim 6, wherein after the optical imaging system independently acquires one set of structured illumination raw image sequences of the biological sample, a plurality of pairs of re-degraded images are generated by performing image re-degradation processing on each structured illumination raw image or a plurality of structured illumination raw images in the set of structured illumination raw image sequences; a first re-degraded image is extracted from each pair of re-degraded images to form a first set of structured illumination re-degraded image sequences, and a second re-degraded image is extracted from each pair of re-degraded images to form a second set of structured illumination re-degraded image sequences; the two structured illumination super-resolution images are generated by performing the structured illumination super-resolution reconstruction on the first set of structured illumination re-degraded image sequences and the second set of structured illumination re-degraded image sequences.

9. The method according to claim 6, wherein during training of the neural network, the degradation processing of the deconvolved image comprises a convolution of the deconvolved image with a super-resolution point spread function of the optical imaging system.

10. The method according to claim 1, wherein a model of the neural network for performing denoising and super-resolution processing on the image comprises one of a U-shaped neural network model, a residual neural network model, a residual channel attention convolutional neural network model, or a Fourier channel attention convolutional neural network model.

11. A system for self-supervised microscopy image super-resolution processing, configured to process raw fluorescence image data of a biological sample acquired by an optical imaging system; comprising:

a computer;

wherein the computer is configured to:

obtain, depending on a type of the optical imaging system, a training set by performing image preprocessing on the raw fluorescence image data using a computer;

train, using the training set in the computer, a neural network for performing denoising and super-resolution processing on an image, wherein the neural network comprises a denoising component and a deconvolution component, wherein the training set comprises input image data and ground truth input image data, pixel blocks at a same position are randomly extracted from the input image data and the ground truth input image data and subjected to random rotation and flipping to serve as a training input image and a training target image respectively; the training input image is first processed by the denoising component to generate a denoised image, and then processed by the deconvolution component to generate a deconvolved image; determine a denoising loss using the denoised image and the training target image, and determine a deconvolution loss based on the deconvolved image, after undergoing degradation processing depending on the type of the optical imaging system, and the training target image; wherein during the training process of the neural network, a loss function comprises the denoising loss and the deconvolution loss, or only comprises the deconvolution loss; and process the raw fluorescence image data using a trained neural network or process additional fluorescence image data of a same biological sample acquired by the optical imaging system using a trained neural network.

12. The system according to claim 11, wherein in a case that the optical imaging system is a wide-field microscopy imaging system, a scanning confocal microscopy imaging system, a light-sheet fluorescence microscopy imaging system, or a two-photon scanning imaging system, the raw fluorescence image data is one or a plurality of two-dimensional noisy images of the biological sample independently acquired by the optical imaging system, and the training set comprises a plurality of pairs of training noisy images, and the plurality of pairs of training noisy images are generated by performing image re-degradation processing on the raw fluorescence image data;

the image re-degradation processing comprises:

for one two-dimensional noisy image, randomly generating, using the computer, a normal distribution random variable with a same image dimension with the two-dimensional noisy image and satisfying a mean of 0 and a variance of 1, and generating a pair of fluorescence-perturbed images using following formulas:

$$\Sigma = \sqrt{\beta_1 y + \beta_2} \tag{1}$$

$$y_A = y + \alpha \cdot \Sigma \cdot z \tag{2}$$

$$y_B = y - \alpha^{-1} \cdot \Sigma \cdot z \tag{3}$$

where, $\alpha$, $\beta_1$, $\beta_2$ are constants randomly generated by the computer, and $\alpha=0.2\sim5.0$, $\beta_1=0.2\sim5$, $\beta_2 0.5\sigma^2\sim1.5\sigma^2$, $\sigma^2$ is bottom noise variance of a camera used in the optical imaging system, y represents the two-dimensional noisy image, z represents the normal distribution random variable, $y_A$ represents one fluorescence-perturbed image in the pair of fluorescence-perturbed images, $y_B$ represents the other fluorescence-perturbed image in the pair of fluorescence-perturbed images, and the pair of fluorescence-perturbed images constitutes one pair of training noisy images;

during training of the neural network, selecting one noisy image from one pair of training noisy images among the plurality of pairs of training noisy images as the input image data, and selecting the other noisy image from a selected pair of training noisy images as the ground truth input image data; and after the training of the neural network, processing the two-dimensional noisy image of the biological sample acquired by the optical imaging system using the trained neural network or processing the raw fluorescence image data using the trained neural network.

13. The system according to claim 12, wherein during the training of the neural network, the degradation processing of the deconvolved image comprises a convolution of the deconvolved image with a point spread function of the optical imaging system.

14. The system according to claim 11, wherein in a case that the optical imaging system is a wide-field microscopy imaging system, a scanning confocal microscopy imaging system, a light-sheet fluorescence microscopy imaging system, or a two-photon scanning imaging system, the raw fluorescence image data is a three-dimensional noisy image volume stack of the biological sample independently acquired by the optical imaging system, the training set comprises a first noisy image volume stack and a second noisy image volume stack augmented from the three-dimensional noisy image volume stack via axial spaced sampling processing, and the denoised image is a denoised image volume stack and the deconvolved image is a deconvolved image volume stack;

the axial spaced sampling processing comprises: for the three-dimensional noisy image volume stack independently acquired by the optical imaging system, extracting odd layers or even layers of the three-dimensional noisy image volume stack as the first noisy image volume stack, and corresponding extracting even layers or odd layers of the three-dimensional noisy image volume stack as the second noisy image volume stack;

during training of the neural network, selecting one from the first noisy image volume stack and the second noisy image volume stack with a one-to-one correspondence as the input image data, and selecting the other from the first noisy image volume stack and the second noisy image volume stack with the one-to-one correspondence as the ground truth image data; and after the training of the neural network, processing the three-dimensional noisy image volume stack of the biological sample acquired by the optical imaging system using the trained neural network or processing the raw fluorescence image data using the trained neural network.

15. The system according to claim 14, wherein during the training of the neural network, the degradation processing of the deconvolved image comprises a convolution of a deconvolved image volume stack with a three-dimensional point spread function of the optical imaging system.

16. The system according to claim 11, wherein in a case that the optical imaging system is a structured illumination super-resolution microscopy imaging system, the raw fluorescence image data is a structured illumination image of the biological sample acquired by the optical imaging system, and the training set comprises two structured illumination super-resolution images, wherein the two structured illumination super-resolution images are obtained by performing structured illumination super-resolution reconstruction on the structured illumination image;

during training of the neural network, one of the two structured illumination super-resolution images is served as the input image data, and the other of the two structured illumination super-resolution images is served as the ground truth image data; and after the training of the neural network, the structured illumination image of the biological sample acquired by the optical imaging system is processed using the trained neural network, wherein the structured illumination super-resolution reconstruction is performed on the structured illumination image.

17. The system according to claim 16, wherein the two structured illumination super-resolution images are generated by performing the structured illumination super-resolution reconstruction on two sets of structured illumination raw image sequences of the biological sample independently acquired by the optical imaging system.

18. The system according to claim 16, wherein after the optical imaging system independently acquires one set of structured illumination raw image sequences of the biological sample, a plurality of pairs of re-degraded images are generated by performing image re-degradation processing on each structured illumination raw image or a plurality of structured illumination raw images in the set of structured illumination raw image sequences; a first re-degraded image is extracted from each pair of re-degraded images to form a first set of structured illumination re-degraded image sequences, and a second re-degraded image is extracted from each pair of re-degraded images to form a second set of structured illumination re-degraded image sequences; the two structured illumination super-resolution images are generated by performing the structured illumination super-resolution reconstruction on the first set of structured illumination re-degraded image sequences and the second set of structured illumination re-degraded image sequences.

19. The system according to claim 16, wherein during training of the neural network, the degradation processing of the deconvolved image comprises a convolution of the deconvolved image with a super-resolution point spread function of the optical imaging system.

20. The system according to claim 11, wherein a model of the neural network comprises one of a U-shaped neural network model, a residual neural network model, a residual channel attention convolutional neural network model, or a Fourier channel attention convolutional neural network model.

* * * * *